June 30, 1964 G. W. PETERS ETAL 3,139,482
CABLE SPREADER

Filed Feb. 18, 1963 2 Sheets-Sheet 1

United States Patent Office 3,139,482
Patented June 30, 1964

3,139,482
CABLE SPREADER
George W. Peters and Harold P. Sleeman, Lima, N.Y., assignors to Joslyn Mfg. and Supply Co., Chicago, Ill., a corporation of Illinois
Filed Feb. 18, 1963, Ser. No. 259,225
4 Claims. (Cl. 174—160)

The present invention relates to what is known variously as a cable spreader or cable spacer, which is a device attached to two or more cables or wires of a high tension electric transmission line, for the purpose of maintaining adequate separation between the cables or wires, especially at intermediate locations between the supporting towers or poles.

An object of the invention is the provision of a generally improved and more satisfactory cable spreader.

Another object is the provision of cable spreader so designed and constructed that its usefulness is not confined to installation at the time of orginally building an electric transmission line, but it may be installed easily, quickly, and safely on a "hot" line already in use, without having to turn the current off of the transmission line when making the installation of the spreader.

Still another object is the provision of a cable spreader of improved insulating ability, well adapted to modern high tension transmission lines operating at very high voltages as compared with those customary a few years ago.

A further object is the provision of a cable spreader so designed and constructed as to be capable of easy, efficient, and economical manufacture at an insulator manufacturing establishment having provision for shaping an insulator on a lathe or similar item of rotary equipment, but having no provision for shaping porcelain by molding or pressing.

These and other desirable objects may be attained in the manner disclosed as an illustrative embodiment of the invention in the following description and in the accompanying drawings forming a part hereof, in which.

Figure 1:
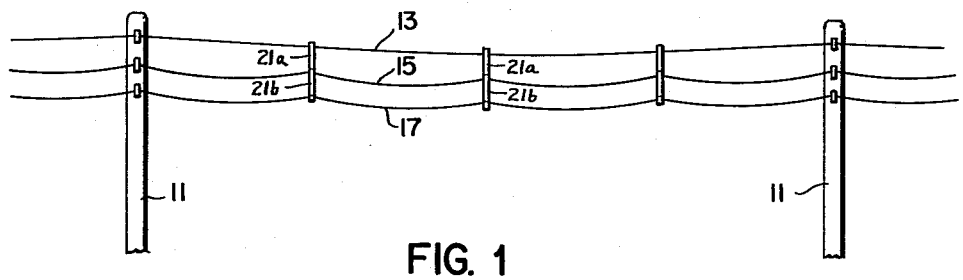
FIG. 1 is a somewhat schematic side elevation of a portion of an electric transmission line with cable spreaders of the present invention applied thereto.

Referring now to FIG. 1, there is shown rather schematically a fragment of an electric transmission line, merely to illustrate the environment in which the cable spreader of the present invention is usefully employed. The transmission line includes towers or poles schematically shown at 11, and from such towers or poles, or from suitable conventional cross-arms attached to them, there are supported a messenger cable 13, and conductor cables 15, 17, and 19. The conductors may be of any suitable number, three of them usually being provided, for a three-phase transmission line. Typically, but not necessarily, two of the conductors are laterally spaced from each other but at the same elevation, so that when viewed as in FIG. 1, the conductor 19 is directly behind the conductor 15 and is hidden from view thereby.

In some transmission lines, the conductor cables extend in a rather long unbroken or unsupported span from one pole or tower to the next. This was acceptable a few years ago, when transmission line voltages were substantially lower than those customary today. At the higher voltages or potentials now in use, a long unsupported span, from one tower or pole to the next, is not satisfactory because when the long spans of cable swing in the wind, two cables may approach each other sufficiently close to cause a flash-over from one cable to another. To avoid this, it is becoming increasingly common to use some kind of cable spreader or spacer to hold the transmission cables in a predetermined pattern spaced from each other, at various points intermediate the tower or pole supports, thereby shortening the spans which are capable of free swinging, and preventing them from swinging close enough to each other to cause a flash-over. In addition to holding the various conductor cables in spaced relation to each other, the cable spreader may also serve the additional function of supporting part of the weight of the conductor cables from a strong overhead cable commonly called a messenger cable, thereby minimizing the risk that one of the high-tension conductor cables may break because of accumulation of sleet or other excessive load.

The foregoing remarks are sufficient to give the general background of the present invention and to enable an understanding of the relationship of a cable spreader to the other portions of the high tension transmission line.

Referring now to the first and preferred embodiment of the present invention, as illustrated in FIGS. 2–5, the cable spreader comprises four insulator elements or components indicated in general at 21, joined to each other and to the messenger cable and conductor cables by various metallic hardware components. The four insulator components may be and preferably are identical with each other, and are indicated individually by the numerals 21a, 21b, 21c, and 21d, respectively. A description of one will therefore suffice for all. Each of them may also be referred to broadly by the reference numeral 21, when there is no need to designate a particular one of them.

Each of the insulator elements 21 comprises a glazed porcelain body considerably longer in an axial direction than its maximum diameter, and having a series of outwardly projecting or radially extending circular or circumferential ribs 23. Between each two ribs the body is necked down or grooved with a circular or annular groove 25. It will be noted especially from FIG. 1 that the various circumferential ribs 23, at the various points along the axial length of each insulator, have about the same external diameter, but that the circumferential grooves 25 are shallower near the ends of the insulator and are of increasing depth toward the center of the insulator. This shape increases the insulating efficiency of the insulators 21, for it decreases the perimeter surface area available for leakage currents at the bottoms of the grooves, where the grooves are deep near the middle of the insulator, at the same time lengthening the surface leakage path from one end of the insulator to the other, and yet the shallower grooves near the ends of the insulator leave adequate porcelain for necessary strength at the ends of the insulator, where the fastening bolts enter for a distance into the ends.

An insulating porcelain body having the shape as just described can be made easily and economically in a porcelain insulator plant or factory which is equipped, as many such insulator factories are, with machinery for shaping wet or unfired porcelain on a lathe. Since each of these insulators 21, in the preferred form of the invention, is in the shape of a surface of revolution, it follows that it can easily be shaped by turning it on a lathe. It requires no pressing or molding operation by special pressing or molding machinery, as is required in manufacturing some of the cable spreaders of the prior art.

Figure 2:
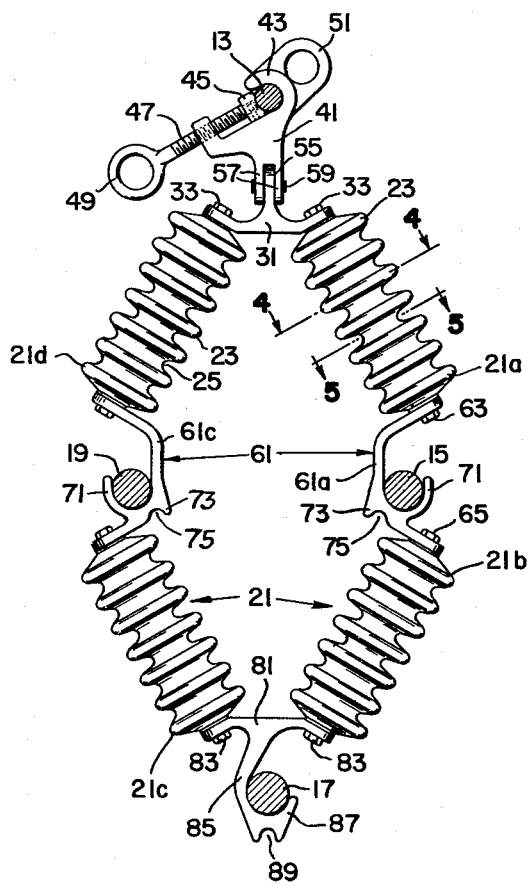
FIG. 2 is a side elevation of a cable spreader according to a preferred embodiment of the present invention, looking at it in a direction along the transmission line, with the electric conductors and the messenger cable shown in vertical cross section.
Figure 3:
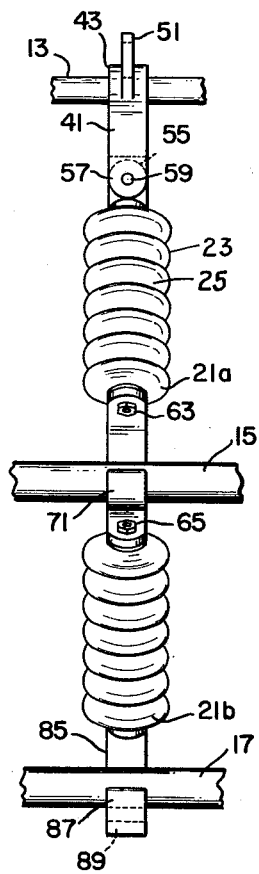
FIG. 3 is a side elevation or edge view of the construction shown in FIG. 2, viewed from a direction at right angles to the direction of FIG. 2.
Figure 4:
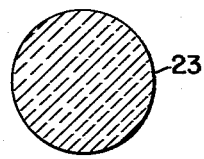
FIG. 4 is a cross section through one of the insulating members of the cable spreader, taken approximately on the line 4—4 of FIG. 2.
Figure 5:
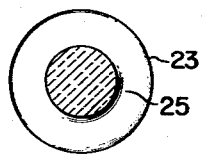
FIG. 5 is a similar cross section taken approximately on the line 5—5 of FIG. 2.

The four cable spreader insulators are connected to each other to form a rigid structure of approximately diamond-shaped outline, by means of various metallic hardware elements or components, as seen in FIG. 2. At the top of the diamond-shaped outline, where the top ends of the individual insulators 21a and 21d come close to each other, they are connected to each other and held in rigid position relative to each other by the metal yoke or connector 31, preferably of strong cast metal such as brass or aluminum alloy. The opposite ends of the member 31 are slightly turned up at an angle as seen in FIG. 2, perpendicular to the respective axes of the insulator members 21a and 21d, and these angled ends are provided with bolt holes which receive bolts 33 extending into and cemented firmly into axial bores or cavities in the end portions of the respective porcelain insulators.

Connected to the hardware element 31, in supporting relation thereto, is a clamp member 41 having cable-receiving notch or groove formed by a hook portion 43 for hooking over the messenger cable 13, and a keeper or clamping block 45 for holding the messenger cable tightly in the notch or groove. The clamping block 45 is operated by a screw 47 which can be turned by a handle portion 49, the handle preferably being of loop formation so that it may be engaged from a distance by a suitable tool and turned to tighten or loosen the clamp 45, without the necessity of closely approaching the screw.

Preferably also the hook portion 43 is extended to form a stationary loop portion 51 which, like the loop 49 on the handle of the screw 47, may be engaged by a suitable tool such as a long insulated rod with a hook on the end of it, so that the spreader may be hooked over the messenger cable 13 by an operator located some distance away, and the clamp mechanism 45, 47, 49 may then be tightened by the operator.

As further mentioned below in connection with FIG. 6, the supporting portion 41 may be rigidly connected to the part 31, and formed integrally therewith, if desired. However, it is preferred to have a pivotal connection between the members 31 and 41. Hence the member 31 is preferably formed with an upwardly extending flange 55 which is embraced between two downwardly extending flanges 57 on the part 41, and a pivot pin 59 extends through these three members, in a horizontal direction at right angles to the direction of the messenger cable 13. With this construction, even though the portion 41 is clamped rigidly to the messenger cable 13, the member 31 and parts supported therefrom may swing slightly on the pivot 59, back and forth in the direction of the messenger cable, under the influence of wind or of loading by sleet or snow, without thereby causing the portion 41 to bend the messenger cable repeatedly where it enters the clamp, which might ultimately result in breakage by reason of fatigue of the messenger cable.

As above stated, the two upper insulator members 21a and 21d have their upper ends connected to and supported from the hardware member 31. The lower ends of these two insulator members are respectively connected to the upper ends of the two lower insulators 21b and 21c, by metallic connector or hardware members which may be designated broadly by the numeral 61. More specifically, the connector which connects the lower end of the insulator 21a to the upper end of the insulator 21b is designated by the numeral 61a, and the other similar connector which connects the lower end of the insulator 22d to the upper end of the insulator 21c is designated 61c. These two connectors may be identical with each other, but they face in opposite directions as plainly seen in FIG. 2.

Each of these connecting members, made of suitable metal such as cast brass or aluminum alloy, has its upper end angled to extend in a direction perpendicular to the axis of the upper insulator to which it is connected, and it is attached thereto by a bolt 63 which, like the bolt 33 at the upper end of the same insulator, extends part way into and is cemented in an axial bore at the lower end portion of the insulator. The lower end of each connector 61 extends in a direction perpendicular to the axis of the respective lower insulator member (21b or 21c, respectively) and it is rigidly connected to such lower insulator by a bolt 65 passing through an opening in the member 61 and cemented in an axial bore in the upper end of the insulator. Between these upper and lower ends of the member 61, the member has an integral lug or flange extending outwardly and curved upwardly as at 71, to form a hook-like notch or socket for receiving and retaining one of the transmission line conductors or cables, 15 or 19, respectively. Dimensions will vary according to the size of conductors for which the spreader unit is designed, the hook 71 having a large enough inside space to accommodate the largest conductor cable which is intended to be used with this construction, such as a conductor cable having diameter of one inch, in which case the internal size of the socket or notch of the hook portion 71 is one inch or a few thousandths of an inch larger than this. Preferably the hook member has a width (in a direction lengthwise of the conductor cable) of about one inch or a little more, so as to provide a relatively large area of bearing for supporting the conductor cable, preventing excessive stress on the conductor cable where it lies in this notch or hook.

As above stated, the hook portions or cable-socket-forming portions 71 of the connectors 61 are on the outer sides of these connectors, that is, the sides away from the center of the cable spreader considered as a while. On the opposite or inner side of each of these connectors 61 is a downwardly extending lug 73 which, in combination with an adjacent part of the connector, forms a small notch 75 which may be described as a tie-wire notch. A tie-wire for securely holding the conductor cable in the notch or socket formed by the portion 71, extends one or more times over the conductor cable, and around the hardware piece 61 and in the tie-wire notch 75, to hold the conductor cable firmly in its supporting notch or hook. The tie-wire is not shown in the present drawings because such tie-wires, in themselves, are well known in the art and are conventional.

Continuing with the description of the cable spreader, and particularly the lower portion thereof, it is seen from FIG. 2 that the lower ends of the two lower insulators 21b and 21c are connected to each other by a metal hardware element 81, the upper part of which is very similar to the lower part of the upper hardware element 31. That is, this element 81, made for example of cast brass or aluminum alloy, has its ends angled to extend perpendicularly to the respective axes of the insulators 21b and 21c, and is rigidly connected to the lower ends of these insulators by bolts 83 which pass through holes in the angled portions of the member 81 and are cemented into axial bores extending a little distance into the lower ends of the respective insulators 21b and 21c.

From the upper portion of the member 81, an integral part extends downwardly a short distance as at 85 and thence laterally and upwardly as at 87 to form a notch or socket for receiving and retaining the third or lower conductor cable 17. Like the notches or sockets formed by the portions 71 of the members 61, this notch formed by the portion 87 preferably has an inner diameter of about one inch or a trifle more, if the construction is intended to accommodate cables up to a maximum diameter of one inch, and it preferably has a width, in a direction lengthwise of the cable, of about one inch or more. The lower end of this element 81 is formed to provide a tie-wire notch 89 for receiving a tie-wire holding the lower conductor 17 in its socket, in a manner similar to that described above in connection with the other conductor cables.

Figure 6:
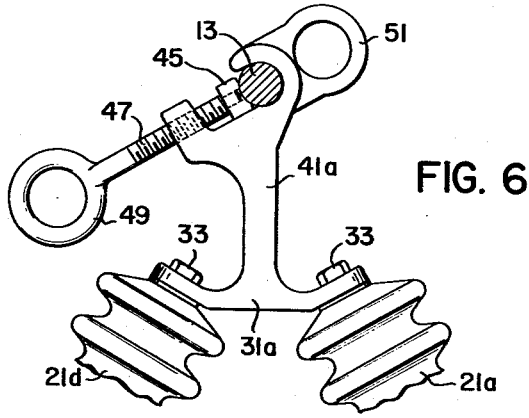
FIG. 6 is a fragmentary view similar to the upper portion of FIG. 2, illustrating a modified construction.

FIG. 6 shows a fragment of the upper part of a structure which is the same as that of FIGS. 2-5 except for the differences mentioned below. In this construction, the pivot 59 of the previous construction is eliminated, and the metallic connecting portion 31a which is bolted to the top ends of the upper insulators is integral with the hanger portion 41a which hooks over the messenger cable 13. In all other respects the construction is the same, and the same reference numerals are used for corresponding parts, as in the previously described construction.

The advantage of the construction illustrated in FIG. 6 is that it is slightly cheaper. It may be used effectively in situations where it is felt that the pivotal arrangement 55-59 is unnecessary. However, in many locations it is preferred to use the pivotal arrangement 55-59, so that as the conductor cables swing in the wind, or as they are subjected to varying loads of snow or sleet, the main portion of the cable spreader may swing slightly in a direction along the transmission line, without cramping or cocking the messenger cable at the point where the cable spreader is clamped tightly to the messenger cable.

Figure 7:
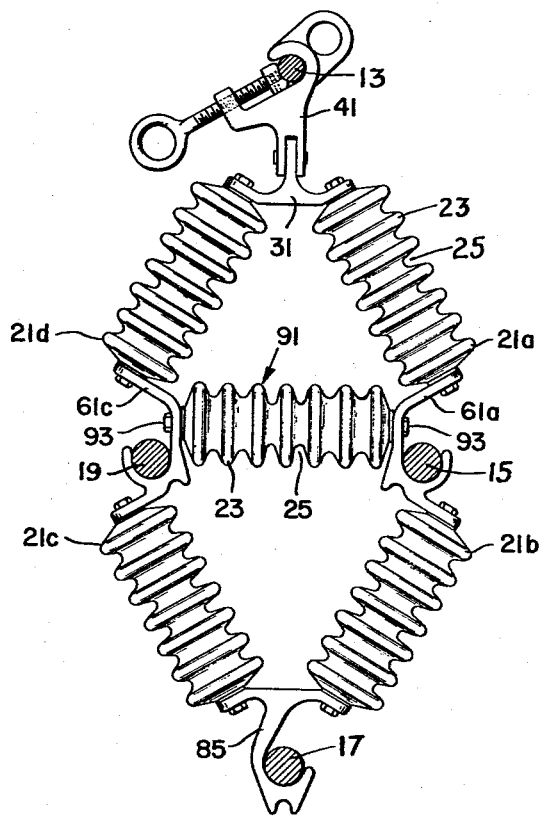
FIG. 7 is a view similar to FIG. 2, illustrating another modification.

In FIG. 7 is shown a modification of the construction, providing a more rigid diamond-shaped outline of the cable spreader. The upper supporting structure may be either of the pivoted type (FIGS. 2 and 3) or of the rigid integral type (FIG. 6), this feature being immaterial so far as the modification of FIG. 7 is concerned. In this modification, a fifth insulator body 91 is provided, extending crosswise between the two hardware elements or connecting members 61, as plainly seen in FIG. 7. A bolt hole is provided at approximately the center of each of the connectors or links 61a and 61c, and bolts 93 passing through these bolt holes extend into and are cemented in short axial sockets in the end portions of the cross insulator 91. The insulator 91 may be a duplicate of the various insulators 21 (21a, 21b, 21c, and 21d) previously described.

This construction using five insulators instead of four, is slightly more expensive than the constructions previously described, but may be advantageous in locations where the transmission line is subject to winds or gusts of unusually high velocity, tending to swing the conductor cables laterally. With this construction, the cross insulator 91 serves as a positive spacer for the cables 15 and 19, preventing any possibility of lateral collapse of the diamond-shaped outline of the spreader.

In all forms of the invention as above described, it is seen that the sockets which receive the conductor cables are accessible laterally from outside of the space enclosed by the diamond-shaped structure. Thus in all forms of the invention, the spreader may be hung on a messenger cable, and then the transmission cables may, by suitable insulated tools, be lifted into their respective notches or sockets or hooks of the cable spreader structure, without disassembling the cable spreader structure in any way and without any further assembling operation after the conductor cables are placed in their notches. Of course tie-wires are preferably used to hold the cables in place, but even the placing of tie-wires can in many cases be accomplished by the use of suitable insulated tools, while the conductor cables are still "hot" or carrying the full intended current and voltage. Thus the cable spreader of the present invention is useful not only in new construction, before the current has been turned on to the line, but also in replacement service or in providing supplemental stability or security for transmission lines already erected and in use, without shutting the lines down.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims. For example, in a construction like that shown in FIG. 7, employing the transverse insulator 91, the two lower insulators 21b and 21c and the metallic connector 85 can be entirely omitted, if it is desired to use the spreader for just the two cables 15 and 19 of a single phase transmission line rather than the three cables of a three phase line.

What is claimed is:

1. A cable spreader for electric transmission cables, comprising a plurality of elongated electric insulators arranged approximately along the sides of a polygonal outline with spaces between the adjacent ends of adjacent insulators, and a plurality of substantially rigid metallic connecting elements connecting one end of each insulator to an adjacent end of a different insulator, both ends of each insulator having respective metallic connecting elements rigidly attached thereto, one of said metallic elements having hook means for engaging a messenger cable and the others of said metallic elements each having hook means rigid with respect to its associated metallic connecting element for engaging and supporting an electric transmission cable, each of said insulators being in the shape of an elongated surface of revolution having an axial length substantially greater than its maximum diameter and having circumferential ridges alternating with circumferential grooves at intervals along its length.

2. A construction as defined in claim 1, wherein the polygonal outline formed by said insulators has four sides defined by four insulators arranged to form a hollow diamond-shaped enclosure, and wherein said hook means on the metallic connecting elements are all located externally of the diamond-shaped enclosure so that the hook means may be engaged with their respective cables without disassembling the diamond-shaped enclosure.

3. A construction as defined in claim 2, including a fifth insulator extending across the diamond-shaped enclosure and connected to the respective metallic connecting elements at two opposite corners of the diamond shape.

4. A construction as defined in claim 1, in which said hook means for engaging a messenger cable is a separate element from said one of said metallic elements with which it is associated and is pivotally connected to said one of said metallic elements by a pivot lying substantially in the plane of the polygon formed by said electric insulators, so that said hook means may oscillate relative to its said one of said metallic elements only about the axis of said pivot and is held substantially rigidly against movement in other directions.

References Cited in the file of this patent

UNITED STATES PATENTS

| | | |
|---|---|---|
| 2,976,344 | Bethel | Mar. 21, 1961 |
| 3,052,751 | Volk et al. | Sept. 4, 1962 |
| 3,095,471 | Price | June 25, 1963 |

FOREIGN PATENTS

| | | |
|---|---|---|
| 939,459 | Germany | Feb. 23, 1956 |
| 1,034,237 | Germany | July 17, 1958 |

OTHER REFERENCES

Hendrix advertisement, Electrical World, October 23, 1961, page 106. Copy in Patent Office Scientific Library.